United States Patent [19]
Herchenroeder

[11] Patent Number: 5,133,533
[45] Date of Patent: Jul. 28, 1992

[54] SACRIFICAL INSERT FOR STRAND ANNEALING FURNACE TUBES

[75] Inventor: Robert B. Herchenroeder, Kokomo, Ind.

[73] Assignee: Haynes International, Inc., Kokom, Ind.

[21] Appl. No.: 535,680

[22] Filed: Jun. 11, 1990

[51] Int. Cl.[5] ............................................. C21D 9/54
[52] U.S. Cl. ..................................... 266/103; 266/274
[58] Field of Search ................ 266/103, 274; 138/147, 138/148, 149, 177, 155; 428/591

[56] References Cited

U.S. PATENT DOCUMENTS

| | | | |
|---|---|---|---|
| 3,976,238 | 8/1976 | Sartorius | 266/265 |
| 4,633,913 | 1/1987 | Carty et al. | 138/147 |
| 4,995,427 | 2/1991 | Berchem | 138/148 |

Primary Examiner—Scott Kastler
Attorney, Agent, or Firm—R. Steven Linne

[57] ABSTRACT

A strand annealing furnace is provided with a tube assembly to shield or protect the strand being annealed from the hot furnace atmosphere. The tube assembly includes a long, outer, oxidation-resistant pipe and a shorter, inner easily removable, insert, protecting at least the entrance end of the tube, so that any residue from drawing lubricants will deposit within the insert rather than block and/or corrode the pipe.

12 Claims, 1 Drawing Sheet

SACRIFICAL INSERT FOR STRAND ANNEALING FURNACE TUBES

FIELD OF THE INVENTION

This invention relates generally to furnaces for heating moving strands and more particularly to improving the service life of strand annealing tubes (or pipes) that are used in annealing furnaces to shield the work being annealed from the furnace environment.

BACKGROUND OF THE INVENTION

In the manufacturing industry, particularly the wire drawing industry, wires (both round and of angular shapes) and small tubes are cold reduced in size by drawing or rolling long strands of the product. Because not all of the cold reduction needed to obtain the final shape can always be obtained without intermediate annealing, the wires are typically continuously annealed by passing them through a long tube or pipe within a furnace which is usually heated by electrical resistance or gas firing and operating at a sufficiently high temperature to cause softening of the cold worked wire. This technique has a number of advantages (along with some disadvantages) over batch annealing but its primary asset is the uniform heating of the product without the harmful effects of extended exposure of the wire to elevated temperatures. Temperatures within the tube may reach as high as 2300° F., but more common are temperatures between 500° F. and 2200° F. depending upon the alloy or product being annealed.

To further protect the product, the atmosphere inside the tube is typically a slowly flowing protective or reducing atmosphere such as argon, hydrogen, cracked ammonia or the like. In some installations, similar tube furnace arrangements may be used with a carburizing or nitriding atmosphere flowing through the tubes in order to chemically treat the wire product as it passes through the furnace. The atmosphere surrounding the outside of the tubes is usually heated air often containing combustion gases. Thus, the tubes or pipes are of necessity made of an expensive alloy which is designed to withstand the high temperatures for extended periods of time. Typical oxidation resistant materials for annealing tubes include INCONEL alloys 600 and 601, INCOLOY 800, HAYNES 214 alloy and the austenitic stainless steels. Extending the service life of such tubes is a prime concern of the industry.

Unfortunately, the theoretical service life of these tubes is often reduced substantially by a combination of clogging, corrosion and/or cracking (and eventual breakage) near the entrance to the hot zone of the tube. The clogging of the internal passageway is most often attributed to residual lubricant on the wire when it enters the annealing tube. Typically, lubricants are used during the cold working operation to prevent damage to both dies and the wire or product being manufactured. One of the prerequisites of such a lubricant is that it adheres tenaciously to the wire and that it be relatively stable to moderate temperatures, perhaps 150° F. This requirement results from the heat created by friction during the drawing operation. Because of the higher furnace temperature, the lubricant melts, drips from the wire, collects on the inside of the annealing tube, and builds up as a hard, cementaious deposit when volatile portions of the lubricant are swept out of the tube by the protective gases. Sometimes the deposit is formed from the combined effect of lubricant and small flakes or chips from the wire. This clogging process usually occurs over a relatively short region close to the entrance end of the tube while most of the tube is less obstructed. In some instances, probably because of variations in temperature, wire speed, or drawing compounds, the clogging occurs closer to the exit end of the tube. These clogged tubes are routinely removed and scrapped even though much of the tube would have significant service life remaining.

Another mode of premature failure of strand annealing tubes is cracking and fracture a short distance inside the entrance end of the furnace leaving a too short (but otherwise serviceable) tube which must be discarded. Three factors are now hypothesized to contribute to these failures. These are (1) accelerated corrosion caused by the dripping and partial volatilization of drawing compounds attacking the metal, (2) thermal shock to the metal tubes caused by relatively cold (maybe 250° F.) drawing compound or steam from damp wire contacting the hot (up to 2300° F.) tube wall, and (3) mechanical abuse. The most common source of mechanical abuse is the vibrations caused by the product to be annealed entering the annealing tube at an angle to the length of the tube. As the wire rubs on the tube at an angle, the force can be divided into at least two components. One which tends to cause the tube to move from its longitudinal axis thereby causing the vibration, and the second which is more or less parallel to the longitudinal axis of the tube, which tends to cause the tube to deviate from linearity in much the same manner as a straight string "snakes" when one end is pushed.

The obvious solutions to the above stated problems would be to clean and dry the product before it enters the annealing furnace to avoid the clogging of the tubes and/or avoid the mechanical abuse mentioned above. To date, cleaning the entering wire is often attempted, but is frequently inadequate. The vibrations caused by the non-alignment of the wire with the centerline of the tube can be eliminated, or at least reduced, by using a guiding mechanism to align the wire with the tube centerline, but for reasons peculiar to individual operations, this is not always feasible.

For many reasons, such as capital equipment costs, space limitations, or characteristics of the drawing compound or wire, the apparent solutions to the problems can not always be utilized. The result is untimely and costly work stoppages, lost production time, increased labor costs for maintenance, and new purchases of costly replacement tubes.

SUMMARY OF THE INVENTION

It is a principal object of this invention to provide a low-cost method to extend the life of strand annealing tubes without totally relying on precleaning of the strand.

It is another object of this invention to provide a sacrificial insert of lower cost material which may be used in a manner to avoid cracking and/or clogging of a higher cost base tube.

To eliminate or alleviate the problems and extend the service life of an annealing tube, the present invention provides a two-piece tube assembly which includes a sacrificial shield or disposable insert, such as a smaller diameter tube or like member. Optionally, the tube may have a slit in its length to facilitate slipping over the wire. The tube is placed in the entrance portion of an oxidation resistance annealing pipe where the lubricant or moisture leaves the wire, to catch the dripping and/or volatilizing lubricant or moisture. When the build-up of the deposit or corrosion is deemed excessive, the insert is removed, discarded and replaced, thereby extending the service life of the basic annealing pipe.

Not only do the inserts of the present invention catch the dripping lubricant etc, they also absorb the brunt of the thermal shock and mechanical abuse noted. After a period of use, the damaged sacrificial insert can be removed and another slipped in place without reducing the furnace temperature or significantly interrupting production. This provides a notable time saving compared to that required to replace an entire length of the costly strand annealing pipe.

The advantages of the disposable insert may include, but are not necessarily limited to: 1) Extended service life of the annealing tube; 2) Improved products; 3) Lower overall costs; 4) Reduced furnace downtime; and 5) Conservation of strategic materials. A further advantage is that a more expensive but higher quality annealing pipe which resists oxidation can be justified so that life of the pipes can be extended, perhaps by a factor of ten, thereby reducing downtime and overall costs to a modest fraction of many current operations.

BRIEF DESCRIPTION OF THE DRAWINGS

While this specification concludes with claims particularly pointing out the subject matter which is regarded as the invention, it is believed that the broader aspects of the invention, as well as further objects, features and advantages thereof, may be better understood from the following detailed description of a presently preferred embodiment when taken in connection with the accompanying drawings in which:

DESCRIPTION OF THE PREFERRED EMBODIMENT

Figure 1:
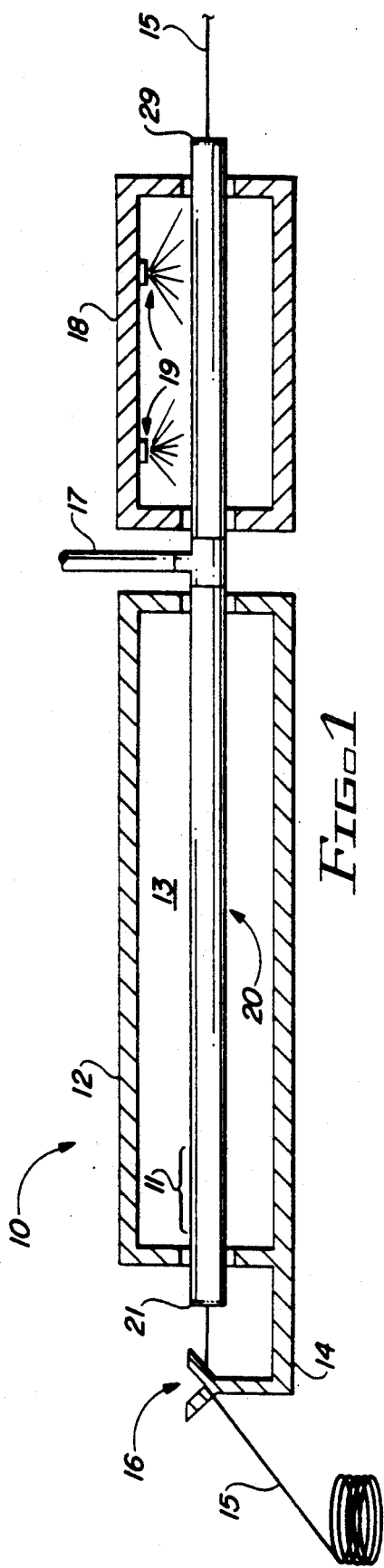
FIG. 1 is an elevational schematic of a strand annealing furnace.

As illustrated in FIG. 1, a strand-annealing furnace 10 consists, in its most basic form, of a heating zone or chamber 12 surrounding at least one, but usually several side-by-side, annealing tube assemblies 20 having an entrance end 21 and a downstream exit end 29. Typically the tubes 20 are ten to forty feet long and are connected, beyond the heating zone 12, to an extension passing through a cooling zone 18 containing, for example, a circulating water bath 19. Typically, a means 17 for supplying a protective atmosphere into the interior of the tube assembly 20 is included near the connection.

Figure 2:
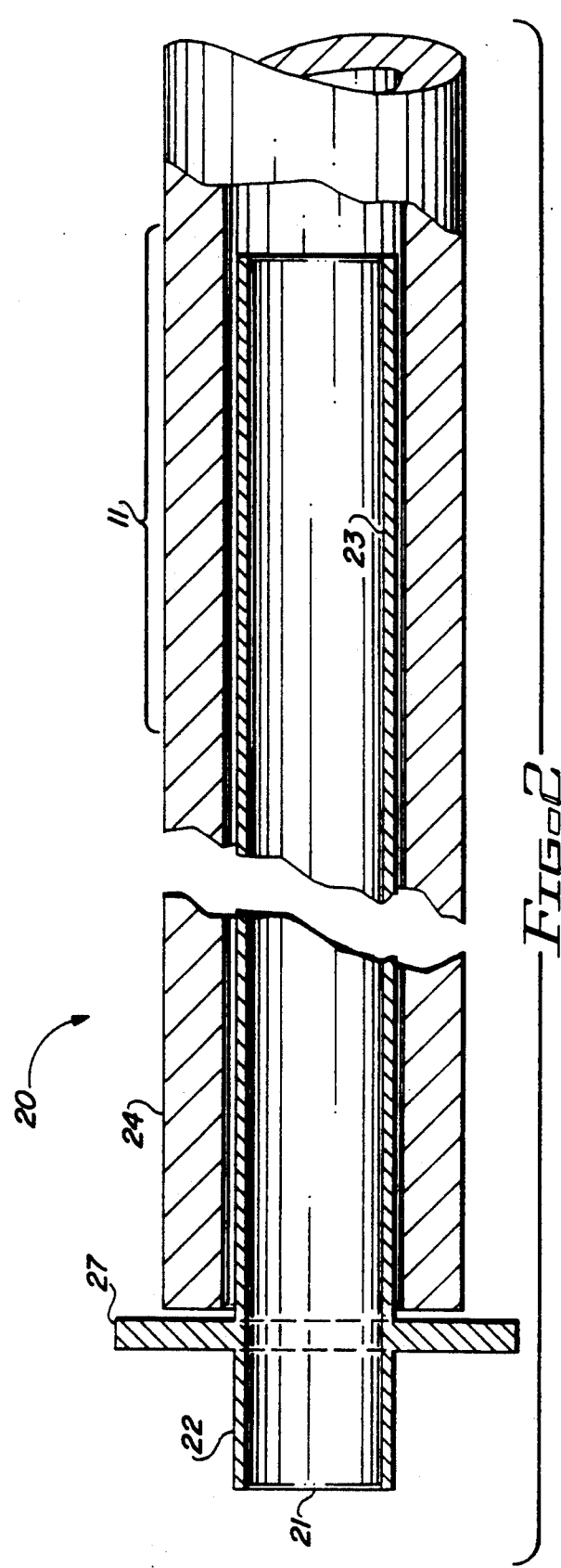
FIG. 2 is a partial longitudinal cross section through a strand annealing tube assembly of the present invention.

FIG. 2 illustrates a partial section through an annealing tube assembly 20 and shows a long, outer pipe or tube 24 surrounding a smaller and shorter insert 22, which extends at least to the cracking region 11 (discussed below). Preferably a collar 27, or other means for preventing the insert 22 from sliding completely into the outer tube 24, is attached near the entrance end 21 of the insert 22. It is important that the outer diameter of the insert 22 be sufficiently smaller than the inner diameter of the outer tube 24 that it may be easily removed after use. The insert 22 may have a slot along its length so that it may be removed without breaking the wire.

During use, a strand of wire 15, or other similar work, is pulled through the heated annealing tube assembly 20 which is contacted by hot air 13, produced by the combustion of natural gas within the heating zone 12, or by other means not shown. As the wire 15 is heated by the hot atmosphere and radiation from the surrounding tube 20, any residual drawing lubricants become more fluid and drip from the wire 15 onto the interior surface 23 of the insert 22 where it eventually builds up a solid deposit. The location of this deposit varies somewhat depending on the speed and temperature of the wire 15 but typically the deposit is found just within the hot zone of the furnace, and generally less than about 30% of the distance from the entrance end 21 of the tube 24 to the exit 29, in the region indicated as 11 in FIG. 1. Since this deposit has been found to be the major source of the corrosion cracking problems experienced with prior art annealing tubes, it is important that the insert 22 of the present invention be sufficiently long to protect or shield the outer pipe 24 at least over this region 11 of greatest deposit. The remaining 70% of the annealing tube 24 is relatively unaffected even after long periods of use. After residing in the heating chamber 12 for a sufficient time to be softened, the wire 15 moves through the cooling chamber 18 to reduce its temperature before leaving the exit end 29 of the tube assembly 20. A protective atmosphere is usually maintained within the tube assembly 20 while the wire 15 is being heated and cooled as it travels through the furnace 10.

To align the wires 15 with the longitudinal centerline of the strand annealing pipe 24, an alignment device 14 may be securely anchored to the annealing furnace 10 or other object which is stationary with respect to the furnace, but structurally isolated from the annealing tube 20. Said alignment device 14 should have a hole or slot 16 (or guide rollers) positioned along the extended longitudinal centerline of the strand annealing tube 20 through which the wire 15 is intended to pass. By first passing the wire 15 through the alignment device 14 and thence into the annealing tube 20, the vibration caused by the wire entering the tube at an angle is eliminated as is the component of the force which otherwise pushes on the end of the tube 20 causing it to "snake".

Because the inside of the annealing tube 20 typically contains an inert or reducing protective atmosphere, a much lower grade material may be used for the insert 22 than for the outer tube 24. This material would not have to be able to withstand the oxidation attack of the hot furnace atmosphere. Thus, the insert 22 might be made of a stainless steel, a plain carbon steel, a carbon composite, or a length of refractory tube such as, but not limited to, alumina or mullite, for example.

Because many wire drawing lubricants contain constituents such as chlorides, zinc, sulfur or potassium, which are quite corrosive at high temperatures, the selection of the insert material would be benefited by choosing a material of construction which is at least somewhat resistant to these corrodants. However, it may be more cost effective to change the insert more frequently so long as the outer tube 24 is protected from attack.

Some of the preferred characteristics of a tube insert 22 include: stability at elevated temperatures, resistance to the corrosive nature of the drawing lubricants, sufficient length to capture the wire's surface contaminants, and a mechanism 27 to prevent the insert from sliding too far into the outer tube 24. Because of the high temperature and the typical reducing atmosphere associated with strand annealing, another important characteristic of the insert 22 is that it not bond with the outer annealing tube 24. Some times it may be necessary to coat the insert and/or the inside surface of the outer tube 24 with a stop-off or parting agent, such as those used to limit the flow of braze alloy in brazing operations, to prevent diffusion bonding of the insert to the tube. Another parting agent which can be used is a slurry of MgO from which the liquid vehicle would evaporate at high temperatures and be swept out of the system by the flowing protective gas of the system. A main prerequisite of such a parting agent is that it does not react at high temperatures to create a bonding rather than a parting situation. A preferred alloy (described below) from which strand annealing tubes 24 and/or inserts 22 may be made, contains sufficient aluminum to form very stable oxides, such as alumina, on their surface even at very low partial pressures of oxygen. In those instances, the parting agent may be automatically formed during service or it may be preformed by pre-oxidation of the insert or, more preferably, the interior of the annealing tube made of such an alloy.

Several designs and assemblies of sacrificial inserts 22 may be used as a means 27 to prevent the inserts 22 from sliding into the outer tube 24. For example, a flared end may be imparted to the end of the insert. A clamped collar may be attached to the end, or the tube may be threaded and a threaded collar may be screwed on to the end of the insert tube. A flange or collar may be welded onto the end of the insert tube. From this, it will be apparent that there are numerous ways of accomplishing the desired ends and I do not limit myself to the examples given.

To further illustrate aspects of this invention, the following examples of unsuccessful as well as successful tests are provided.

EXAMPLE I

A strand annealing tube 24 having a nominal composition by weight percent of about 72 Ni, 15.5 Cr, 8 Fe, plus small amounts of Si, Mn, C, Al, and Ti (commonly known in industry as alloy 600) which was operating at about 1900° F. in a gas fired furnace, failed prematurely within 45 days at a location about 2 to 3 feet from the entrance 21 of the annealing tube, inside the furnace heating zone 12. Examination of a section near the broken end unexpectedly showed that the fractures initiated at the inside diameter (I.D.) of the pipe rather than from burn through from the outside. Further examination disclosed that the I.D. was significantly corroded, presumably by contaminants from residual drawing compounds being carried in on the wire 15 being annealed.

EXAMPLE II

In a first attempt to prevent the type of premature failures experienced in Example I, another strand annealing tube 24 was made from an oxidation resistant alloy which had a nominal composition (in weight percent) of about 75 Ni, 16 Cr, 3 Fe, 4.5 Al plus small amounts of Si, Mn, C, B and yttrium (known in the art as HAYNES 214 alloy and described more fully in U.S. Pat. No. 4,460,541). It was installed in an annealing furnace, operating at about 2200° F., but, in contrast to Example I, the wire was precleaned of drawing lubricant and dried. After more than two years' of service there was no apparent deterioration of the tube. However, in a second trail in the same furnace, the cleaning unit malfunctioned and the tube 24 failed just inside the furnace 10 by a fracture initiated on the I.D. of the tube after less than about six months of use. Close examination of the failure revealed that the time to fracture was probably accelerated by mechanical vibration but due chiefly to corrosion and thermal fatigue resulting from the precleaner failure.

EXAMPLE III

In order to test the validity of the insert concept and eliminate the need for the precleaning, a comparison test was set up with two strand annealing tubes made of ⅜" diameter, schedule 40 pipe of HAYNES 214 alloy utilizing the same furnace as in Example I. In one annealing tube, a five-foot insert 22 made of grade 304 stainless steel with a 0.035" wall thickness was placed in the entrance portion of the 20 foot long tube in an attempt to catch the contaminants from the wire and protect the base tube. Unfortunately, the insert was left in service six weeks, which was too long in this case, with the result that the insert had corroded through and a portion of it was eventually dragged by the moving wire to near the exit end 29 of the tube.

When the entire HAYNES 214 alloy tube was removed after failure in about 4½ months of service, the annealing tube, and another similar companion tube in service the same length of time, were sectioned at various locations along their length. The locations of the greatest deposits were ascertained and the relative amount of clogging or blockage was estimated.

In the annealing tube which had the insert 22 for at least part of the time, the maximum blockage was less than 50 percent at a location about 6 feet inside the annealing tube while the annealing tube without the insert was clogged to about 80% about 5 feet inside the annealing tube. This test demonstrated, at least in part, the effectiveness of the insert in containing the deposits and the need for replacement prior to failure.

Again, the mode of failure of the tube was cracking and fracture just inside the furnace wall about 1 to 3 feet from the entrance end in an area of accelerate corrosion on the I.D.

As an example of internal corrosion caused by the accumulation of lubricant on the I.D., one tube examined had severe intergranular attack to a depth of about 13 mils and a lessor attack for an additional depth of at least 12 mils. The outside diameters of the annealing tubes had a tight adherent oxide film and were essentially unaffected otherwise. Analyses of the severely corroded 304 stainless steel insert tube revealed the corroding species to contain levels of silicon, Cl, K, Zn and perhaps calcium.

It should be evident from this example that the insert will reduce the amount of clogging at the entrance and probably could eliminate it entirely if it is replaced soon enough. It is also evident that the corrodants would have been contained within the insert if it had been slightly longer (e.g. 30% rather than 25% of the tube length) and had been replaced in a more timely fashion.

While in order to comply with the statutes, this present invention has been described in terms more or less specific to one preferred embodiment, it will be apparent to those skilled in the art that the novel principles of the invention disclosed herein in connection with specific examples thereof will support various other modifications and applications of the same. It is accordingly desired that, in construing the breadth of the appended claims, described. they shall not be limited to the specific examples of the invention described.

What is claimed is:

1. A strand annealing tube assembly adapted for use within a heating zone of a metallurgical furnace to shield a drawn strand movable therethrough from the hot atmosphere within said furnace comprising:
- an oxidation-resistant metallic outer pipe having an entrance end, an exit end and a length sufficient to span said heating zone within said furnace,
- an easily removable, residue collecting, insert within only a portion of said pipe, including said entrance end thereof, and extending for a distance sufficient to protect said pipe from corrosion by residual drawing lubricants carried into said pipe by said drawn strand,
- an aluminum-oxide parting agent between said insert and said metallic outer pipe to prevent bonding thereof, and
- means for preventing said insert from sliding away from said entrance end of said outer pipe.

2. The assembly of claim 1 wherein said outer pipe is a nickel-base alloy containing at least 4% aluminum and said parting agent is an aluminum-oxide film formed by oxidation of said alloy on the inner surface thereof.

3. The assembly of claim 1 wherein said means for preventing sliding is a collar attached to a portion of said insert extending from said one end of said pipe.

4. The assembly of claim 1 further including means for introducing a protective atmosphere into the interior of said pipe and said insert is made from a non-oxidation resistant material.

5. The assembly of claim 1 wherein said insert shields the inner surface of said pipe over a region extending up to about thirty percent of the pipe's length.

6. The assembly of claim 1 wherein said insert is made from a material selected from the group consisting of plain carbon steels, stainless steels, carbon composite, alumina, and mullite.

7. In a metallurgical annealing furnace having at least one oxidation-resistant metal alloy pipe extending through a heating zone thereof and adapted to shield a drawn strand movable therethrough from the heating atmosphere, the improvement comprising a removable, internal insert made of corrosion resistant material and extending from the entrance end of said pipe for a distance sufficient to protect said pipe from corrosion cracking due to residual drawing lubricants carried into said furnace by said strand in combination with an aluminum-oxide surface film between said insert and said metal alloy pipe to prevent bonding thereof.

8. The furnace of claim 7 further including means for introducing a protective atmosphere into the interior of said pipe.

9. The furnace of claim 7 further including means for aligning said strand with the longitudinal centerline of said pipe.

10. The furnace of claim 7 wherein said pipe is a nickel-base alloy containing at least four percent aluminum, and said aluminum-oxide surface film is formed by oxidation of the inner surface of said alloy pipe.

11. The furnace of claim 7 wherein said insert extends about thirty percent of the length of said pipe.

12. The furnace of claim 7 further including means for preventing said insert from sliding into said pipe away from said entrance end.

* * * * *